Sept. 9, 1930.  A. L. MALMBERG  1,775,288
PISTON AND PISTON RING
Filed Dec. 17, 1928
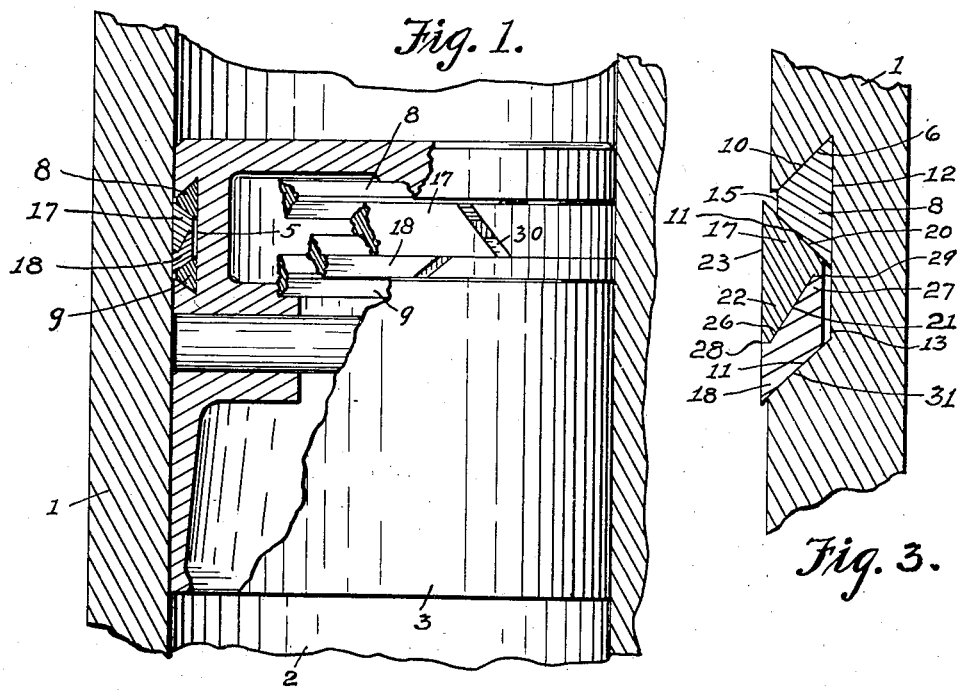
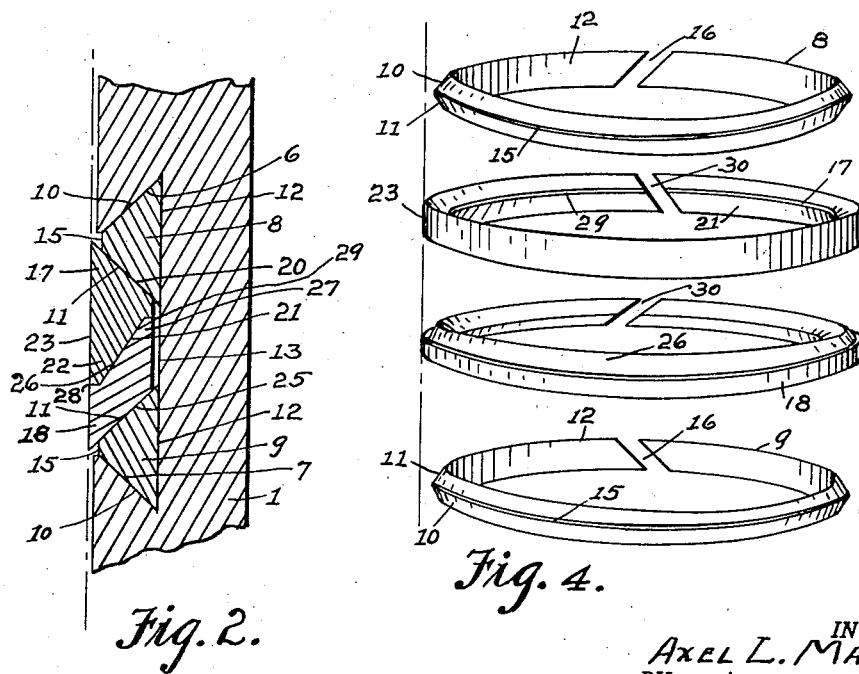
INVENTOR;
AXEL L. MALMBERG.
BY Horace Barnes,
ATTORNEY.

Patented Sept. 9, 1930

1,775,288

UNITED STATES PATENT OFFICE

AXEL L. MALMBERG, OF EAGLE CLIFF, WASHINGTON, ASSIGNOR TO M & M PISTON AND RING COMPANY, OF PORTLAND, OREGON, A CORPORATION OF OREGON

PISTON AND PISTON RING

Application filed December 17, 1928. Serial No. 326,526.

This invention relates to improvements in pistons for reciprocating engines of either the internal combustion or steam types and to the packing rings utilized therewith, and particularly to that type of piston packing devices illustrated and described in my prior Patent No. 1,495,705.

The principal object of the present invention is to provide a piston and piston-rings therefor of simple and practicable construction which will effectually seal the cylinder from leakage past the piston with consequent gain in power and the prolongation of the life of the piston-rings and cylinder-walls through absence of carbon deposits and undue heat changes.

A further object of the invention resides in the provision of a pair of piston-rings which are mutually formed and associated together in such relation that they constitute effectively a single ring having a relatively long wearing-face contacting with the cylinder-walls and which may be oppositely arranged in the piston-groove therefor with respect to their partings as to expand with relatively even, complementary pressure upon the cylinder-walls so that, together with similar spacing of the bearing-rings, the wear thereon will be equalized and the cylinder caused to retain its circular configuration during a long period of usage.

A still further object of the invention is to provide adequate and uniform expansion of the piston-rings upon the cylinder-walls through the agency of the rings themselves and the slight but effective reactionary pressure afforded by the bearing-rings of triangular configuration in cross-section, all of which rings being expansible and have their partings spaced about the cylinder to equalize the pressure of the rings thereon.

Other objects and advantages in my invention, and objects relating to details of construction thereof will be readily apparent in the course of the detailed description following.

In the accompanying drawings—

Figure 1 is a fragmentary view in vertical section of a cylinder of an internal combustion engine and illustrating therein my improved piston and rings, shown partly in section and partly in side elevation.

Fig. 2 is a fragmentary view in section upon an enlarged scale of the improved piston and rings.

Fig. 3 is a view similar to Fig. 2 of a modified form of the invention.

Fig. 4 is a separated perspective view of my novel piston- and bearing-rings.

Referring to said views, the reference numeral 1 indicates the cylinder-walls of an engine of the internal combustion type and 2 the cylinder-bore. A piston 3 operable in said bore may be of the usual construction and formed with a single annular groove 5 characterized by its somewhat larger vertical dimensions and by having inclined undercut upper and lower marginal edges, as at 6 and 7, affording in effect a so-called "dove-tail" configuration to the groove in cross-section.

Bearing-rings 8 and 9 of triangular configuration in cross-section are respectively seated in the upper and lower undercut edges of the groove, each having inclined faces 10 opposed to and corresponding to the respective edges 6 and 7. The lower and upper faces 11 of said rings, respectively, are likewise inclined at approximately the same angles while the rear, vertical side or base 12 of each said ring is in parallel with the rear wall 13 of the groove and may be in contact therewith, particularly when the rings are newly installed. When thus seated the outward apex 15 of each of the bearing-rings is spaced inwardly to a slight extent from the outer surface of the piston so that the rings may move outwardly to some extent under their expansive force to take up any wear in the piston-rings, as will presently be described, without extending outwardly beyond the piston-rings. Each of said bearing-rings is formed with an inclined parting cut 16 and it is found that the desirable angle for the faces 10 and 11 thereof be approximately forty-five degrees from their bases 12.

The piston-rings proper 17 and 18 constitute in effect a single ring as they are interfitting and have no relative or telescopic movement. The upper ring 17 is formed with an upper face 20 having an angle corresponding to the lower face 11 of the bearing-ring 8 and a lower face 21 inclined at approximately sixty degrees thus affording an annular flange 22 extending outwardly of the lower ring 18 and presenting a relatively broad outer face 23 contacting with the cylinder-walls. The lower ring 18 is formed with a lower inclined face 25 corresponding with the upper face 11 of the ring 9 and its upper face 26 is inclined to correspond with the lower face 21 of the ring 17. The ring 18 is further formed with an annular flange 27 extending inwardly of the ring 17 and lying to the rear of the corresponding flange 22 of the upper ring 17. Ledges 28 and 29 are formed at the bases of the flanges 22 and 27 with which the outer extremities of said oppositely disposed flanges respectively engage so that the rings 17 and 18 will be prevented from relative vertical movement and perform their functions as a single ring having a relatively broad face contacting with the cylinder-walls.

The two rings 17 and 18 are each formed with a parting cut 30 that are preferably inclined oppositely and set when in operative position at diametrically opposite points about the piston-groove. Similarly, the bearing-rings 8 and 9 have their partings set in the groove intermediate those of the piston-rings and upon opposite sides of the piston so that said partings will occur approximately ninety degrees apart about the perimeter of the piston. In this manner the outward tension of the four rings inserted in the groove will be practically equalized and the outward pressure that is usually exerted upon the cylinder walls upon each side of the partings in the ordinry piston-ring will be distributed in approximately an even manner about their entire perimeter with consequent equalized wearing effect upon the cylinder-walls.

In practice but one set of rings will be required to seal a piston from leakage. The broad contacting surfaces upon the cylinder-walls together with the equalized tension causes the rings to retain almost perfect circular configuration and at all times ensures an efficient check to losses of pressure and leakage of gas while the normally light but effective expansion of the piston-rings together with that of the bearing-rings at their rear will take up all wear for an extremely long period. The expansion of the bearing-rings with their wedge-like contact upon the piston-rings results in the maintenance of a desired amount of pressure without undue friction upon the cylinder-walls that ensures permanance of operation over an indefinite period.

In some types of engines it is found that the employment of two bearing-rings positioned upon opposite sides of the groove 5 is not necessary for the effective sealing of the piston and sometimes is not desirable. In such cases only the upper end of the groove is undercut within which the bearing-ring 8 is engaged while upon the opposite edge instead of being undercut it is inclined, as at 31, see Fig. 3, outwardly and downwardly substantially in a plane parallel with the upper undercut edge 6. Thus the lower ring 9 is dispensed with and the lower face 25 of the piston-ring 18 will engage directly such salient lower marginal edge 31 of the groove in substantially the same manner as in which it is illustrated in Figs. 1 and 2 as engaging the bearing-ring 9, that is to say, in inclined relation, while the expansion of the upper bearing-ring 8 will be sufficient to maintain the rings in operative condition and to take up any wear that may occur.

Having described my invention, what I claim is:—

A piston and rings therefor, consisting in a piston having an annular groove formed with undercut side edges, a pair of bearing-rings each have one side in engagement with said side edges, respectively, of the groove and having their outer sides oppositely inclined with respect to a horizontal plane extended between said rings, and a pair of piston-rings each having a face in inclined engagement with said inclined faces of said bearing-rings, respectively, said piston-rings being interfitting to present a continuous outer surface contacting with a cylinder-wall.

AXEL L. MALMBERG.